(12) United States Patent
Gauthier, Jr.

(10) Patent No.: US 9,599,697 B2
(45) Date of Patent: Mar. 21, 2017

(54) NON-CONTACT FIBER OPTIC LOCALIZATION AND TRACKING SYSTEM

(71) Applicant: The Johns Hopkins University, Baltimore, MD (US)

(72) Inventor: Leo R. Gauthier, Jr., Ellicott City, MD (US)

(73) Assignee: The Johns Hopkins University, Baltimore, MD (US)

( * ) Notice: Subject to any disclaimer, the term of this patent is extended or adjusted under 35 U.S.C. 154(b) by 382 days.

(21) Appl. No.: 14/253,093

(22) Filed: Apr. 15, 2014

(65) Prior Publication Data

US 2016/0216356 A1     Jul. 28, 2016

(51) Int. Cl.
*G01S 3/781*     (2006.01)
*G01S 3/782*     (2006.01)

(52) U.S. Cl.
CPC .............. *G01S 3/781* (2013.01); *G01S 3/782* (2013.01)

(58) Field of Classification Search
CPC ........................................................ G01S 3/781
USPC ........................................................ 356/121
See application file for complete search history.

(56) References Cited

U.S. PATENT DOCUMENTS

| | | | |
|---|---|---|---|
| 4,574,199 A * | 3/1986 | Pryor .................. | G01B 11/007 250/559.33 |
| 4,593,187 A | 6/1986 | Grotts et al. | |
| 5,085,507 A | 2/1992 | Williams et al. | |
| 5,196,714 A | 3/1993 | Garcia, Jr. et al. | |
| 5,227,859 A | 7/1993 | Leib et al. | |
| 6,792,185 B1 | 9/2004 | Ahrens et al. | |
| 6,829,442 B2 | 12/2004 | Murray et al. | |
| 6,987,568 B2 | 1/2006 | Dana | |
| 7,046,338 B2 | 5/2006 | McGuire | |
| 7,071,460 B2 | 7/2006 | Rush | |
| 7,349,099 B2 | 3/2008 | Tai et al. | |
| RE41,949 E | 11/2010 | Barbour et al. | |
| 7,952,079 B2 | 5/2011 | Neustadter et al. | |
| 2003/0164952 A1* | 9/2003 | Deichmann .............. | A61B 1/05 356/603 |
| 2003/0226956 A1 | 12/2003 | Rush | |
| 2005/0211885 A1* | 9/2005 | Tobiason ............ | G01D 5/34723 250/231.13 |
| 2008/0283116 A1 | 11/2008 | Banin et al. | |
| 2009/0159115 A1 | 6/2009 | Banin et al. | |

(Continued)

FOREIGN PATENT DOCUMENTS

JP     2012-015780     1/2012

OTHER PUBLICATIONS

US 7,515,278, 04/2009, Beaulieu et al. (withdrawn)

*Primary Examiner* — Tarifur Chowdhury
*Assistant Examiner* — Omar Nixon
(74) *Attorney, Agent, or Firm* — Noah J. Hayward

(57) ABSTRACT

A system for detecting and tracking one or more of direction, orientation and position of one or more light sources includes one or more optical fiber sensors configured to receive light from the one or more light sources and to generate a plurality of cones of light according to relative positions of the one or more optical fiber sensors relative to the one or more light sources. The system includes light data processing circuitry configured to detect characteristics of the plurality of cones of light and to determine one or more of direction, orientation, or position of the one or more light sources relative to the one or more optical fibers.

20 Claims, 7 Drawing Sheets

(56) References Cited

U.S. PATENT DOCUMENTS

| | | | |
|---|---|---|---|
| 2009/0314925 A1 | 12/2009 | Van Vorhis et al. | |
| 2010/0020333 A1* | 1/2010 | Kunz | A61B 5/1076 356/603 |
| 2011/0001067 A1* | 1/2011 | Pagilla | G01B 11/028 250/559.36 |
| 2011/0141476 A1 | 6/2011 | Schmaelzle et al. | |
| 2011/0157603 A1* | 6/2011 | Alvarez Diez | G01S 5/16 356/614 |

* cited by examiner

NON-CONTACT FIBER OPTIC LOCALIZATION AND TRACKING SYSTEM

STATEMENT OF GOVERNMENTAL INTEREST

This invention was made with government support under contract number N00024-03-D-6606 awarded by the Naval Sea Systems Command (NAVSEA). The government has certain rights in the invention.

TECHNICAL FIELD

Example embodiments of the invention relate to light detection and, in particular, to localizing or tracking one or more light sources using one or more fiber optic sensors.

BACKGROUND

When light enters a fiber optic waveguide at an angle relative to a normal directional facing of a distal end of the fiber, the light is emitted from the opposite or proximal end of the fiber optic waveguide as a cone having angles of its sides that are based on the angle of incidence of the light onto the receiving end of the fiber optic waveguide. In particular, the angle of incidence of the light onto the receiving end of the fiber optic waveguide is the same as the angle at which the light exits the emitting or proximal end of the fiber optic waveguide according to the well-known principle of total internal reflection. The characteristics of the cone, such as the shape of the base of the cone projected onto a detection surface, may then be analyzed to determine the angle of incidence of the light onto the receiving end of the fiber optic waveguide. The direction and location of the light source may not be determined from a single waveguide measurement, since the direction of the light source may correspond to any point along the sides of the corresponding receiving cone from the distal end of the fiber. However, measurements from multiple fiber optic waveguides may be combined to localize and track optical sources.

In addition, if the sources are spatially fixed with respect to each other and attached to some other secondary structure, the detection system can effectively track the position and orientation of said secondary structure.

There is significant established need and prior art in the use of optical technologies and methods for localization and tracking purposes. These include interferometric techniques, such as those described in U.S. Pat. Nos. 7,515,275 and 7,349,099, the contents of which are hereby incorporated by reference in their entirety, as well as numerous methods based on triangulation, imaging, both monoscopic and stereoscopic, position sensitive detectors (PSDs), and active laser ranging methods based on time of flight measurements. However, fiber optic sensors have not typically or commonly been used for localization and tracking. In some cases, localization and tracking using fiber optic sensors has distinct advantages over other tracking methods. For instance, in some cases, the sensing head of the tracking system must be low profile and must be able withstand high temperatures or other extreme environmental conditions that would preclude the use of imagers or other direct sensing components such as PSDs.

U.S. Patent application No. 2009/0314925 (Van Vorhis et al.), Fiber Optic Tracking System and Method for Tracking, which is hereby incorporated by reference in its entirety, describes a method for tracking an object by processing the signal from an optical fiber that is attached to the tracked object.

U.S. Pat. No. 7,071,460 (Rush), Optical Non-Contact Measuring Probe, which is hereby incorporated by reference in its entirety, describes an active sensor that emits an optical signal towards a proximate surface and then couples the reflected signal back into an optical fiber. The light pattern exiting the proximal end of the fiber is analyzed to compute the displacement to the reflective surface. This active sensor is intended for use in restricted spaces for very small displacements over a range of a few millimeters.

U.S. Pat. No. 6,792,185 (Ahrens, et al.), Method and Apparatus for Automatic Tracking of an Optical Signal in a Wireless Optical Communication System, which is hereby incorporated by reference in its entirety, describes a method, using a fiber optic bundle, to maintain directional coupling to a communications signal by comparing the amplitudes of the signals from various fibers in the array to generate a feedback signal to adjust the orientation of the receiving unit.

U.S. Pat. No. 5,196,714 (Garcia, Jr., et al.), System for X-Y Alignment and Tracking of Moving Targets Having Angular Displacement with Fiber Optic Sensing Surface, which is hereby incorporated by reference in its entirety, describes a fiber optic system and method for tracking a source, based on triangulation, and using row and column arrays of fibers.

U.S. Pat. No. 5,085,507 (Williams, et al.), Device for Three Dimensional Tracking of an Object, which is hereby incorporated by reference in its entirety, also uses column and row arrays of fiber optic sensors to determine the position of a source.

BRIEF SUMMARY OF SOME EXAMPLES

Embodiments of the invention include a system for localizing and tracking one or more light sources. The system includes one or more optical fiber sensors configured to receive light from the one or more light sources, and to emit a plurality of cones of light from the proximal ends of said fiber sensors according to relative positions of the one or more optical fiber sensors relative to the one or more light sources. The system includes light data processing circuitry configured to detect characteristics of the plurality of cones of light and to determine a direction of the one or more light sources relative to the one or more optical fibers.

Additional aspects of the invention relate to a method of localizing or tracking one or more light sources. The method includes receiving, by a light-receiving or distal ends of one or more optical fibers, light from the one or more light sources and emitting, by the light-emitting or proximal ends of the one or more optical fibers, a plurality of cones of light according to relative positions and orientations of the one or more optical fibers relative to the one or more light sources. The method includes detecting, by light data processing circuitry, characteristics of the plurality of cones of light and determining the direction of the one or more light sources relative to the one or more optical fibers based on the characteristics of the plurality of cones of light.

Additional features and advantages are realized through the techniques of the present invention, including repetitive measurements that provide a means to localize and track light sources or objects over time. For example, two direction measurements of a stationary source from a moving platform provide a means of using triangulation to identify the position of the source, even if the source is a laser. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

The example, non-limiting embodiments hereafter described relate to localizing and tracking one or more light sources, such as the direction and location of the one or more light sources, relative to one or more optical fiber sensors by determining characteristics of cones of light emitted by the one or more optical fiber sensors.

Figure 1:
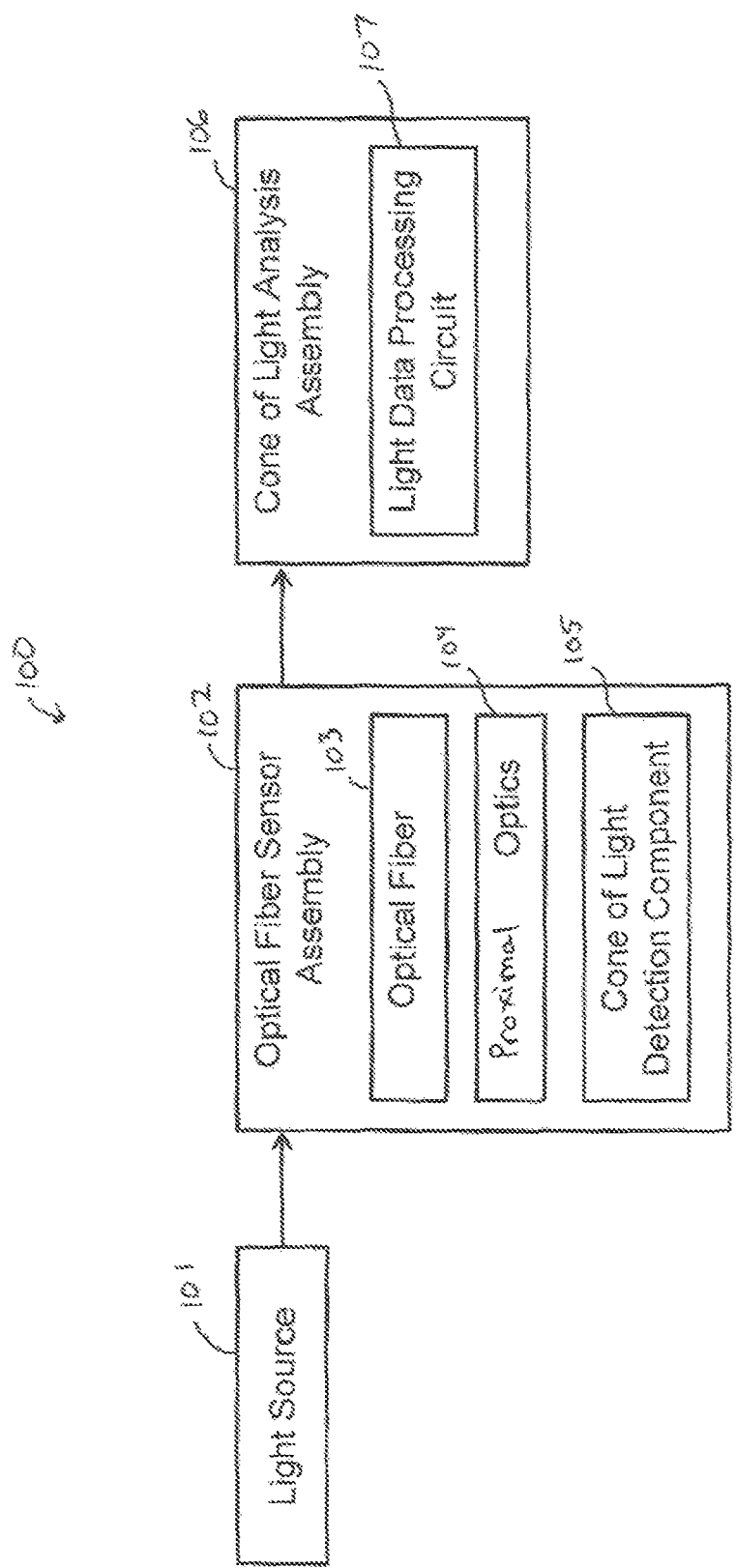
FIG. 1 illustrates a block diagram of a system for localizing and tracking light sources or objects attached to light sources according to an embodiment of the invention.

FIG. 1 illustrates a block diagram of a system 100 for determining spatial characteristics of a light source 101 according to an embodiment of the invention. The system 100 includes a light source 101, an optical fiber sensor assembly 102 that receives light from the light source 101, and a cone-of-light analysis assembly 106 that receives data corresponding to cones of light from the optical fiber sensor assembly 102 and analyzes the data to determine spatial characteristics of the light source 101. According to embodiments of the invention, optical fibers may include any type of optical fibers or light guides, including bundles of fibers, unless otherwise indicated.

The optical fiber sensor assembly 102 includes optical fibers 103 having light-receiving ends to receive light from the light source and light-emitting ends to emit cones of light corresponding to the light from the light source. The distal ends of the optical fibers may include lenses to focus the optical signals, which is a standard practice. The optical fiber sensor assembly 102 includes proximal optics 104, such as refractory optics, reflective optics, or any other optical surfaces that facilitate the measurements of the light cones that are projected from the optical fiber 103 and onto the cone-of-light detection component 105. The detection component 105 may include an optical sensor array, such as a line scanner or camera, or any other light-detecting device or component. Other examples include a photodiode or an imaging chip, such as a color or monochrome charge-coupled device (CCD) or a color or monochrome complementary metal oxide semiconductor (CMOS) imager, an array of photodiodes or other light sensitive materials, an array of color or monochrome CCDs, or an array of color or monochrome CMOS imagers. In one embodiment, the array is a one-dimensional array or a series of detection devices arranged in a line.

The cone-of-light analysis assembly 106 includes a light data processing circuit 107, which may include one or more of a microprocessor, logic circuitry, memory, and any other circuitry capable of analyzing data resulting from the measurement of projected cones of light onto the surface of the sensing array, such as angles of incidence intensity, spectra, temporal variations, and times of occurrence. The cone-of-light analysis assembly 106 is also capable of combining multiple concurrent angle of incidence measurements to compute source directions and positions, combining multiple non-concurrent direction measurements to compute source positions, and to combine multiple non-concurrent position measurements for tracking purposes. In one embodiment, the cone-of-light analysis assembly uses several robust algorithms, including unconstrained non-linear optimization and iterative grid searches to find tracking solutions.

Figure 2:
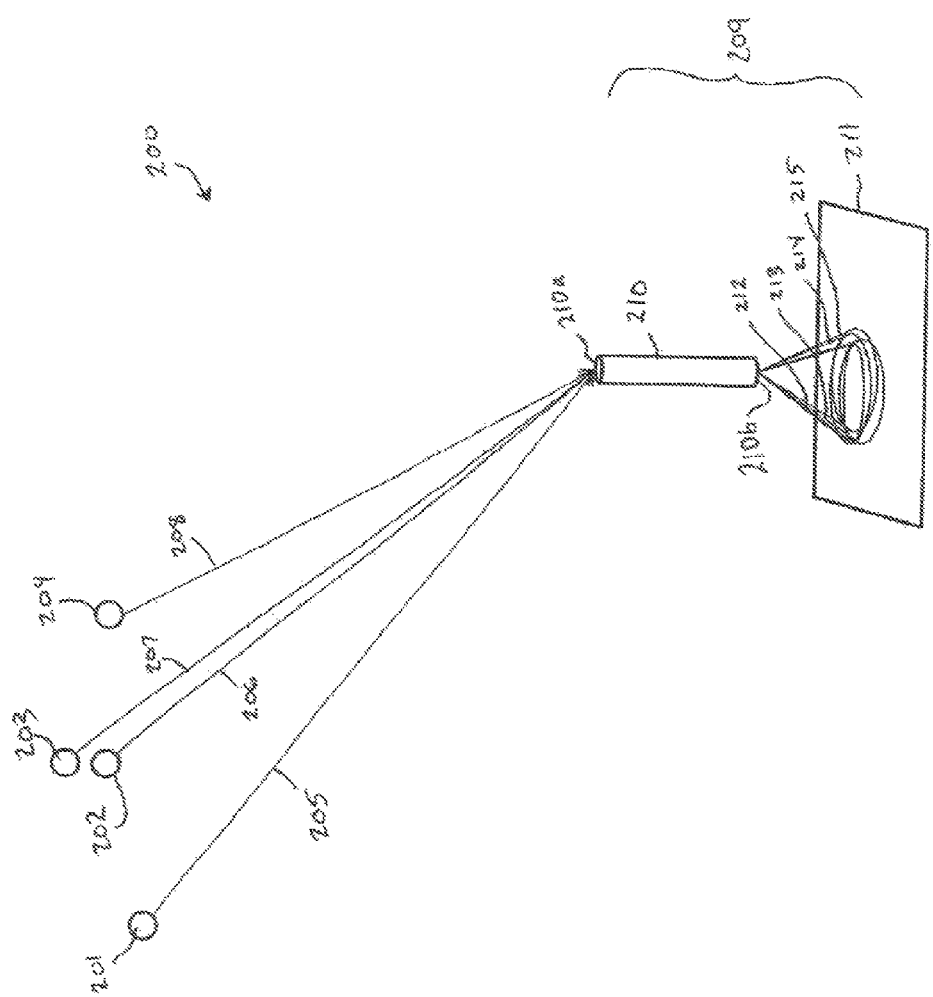
FIG. 2 illustrates a system for localizing and tracking the position of the sensor system with respect to multiple light sources according to another embodiment of the invention.

FIG. 2 illustrates a system 200 for detecting spatial characteristics of a light source according to another embodiment of the invention. In the embodiment illustrated in FIG. 2, the light source includes a plurality of light sources 201, 202, 203, and 204, and the arrows 205, 206, 207, and 208 represent light emitted from the respective light sources 201, 202, 203, and 204. In one embodiment, the light sources 201 to 204 are each of a different color. In another embodiment, the sources of light are modulated by distinguishable patterns over time. In yet another embodiment, the light sources are distinguishable by a combination of spectral and temporal modulations.

The system 200 includes an optical fiber sensor assembly 209 including an optical fiber or light guide 210 including a light-receiving end 210a (or distal end) for receiving the light 205 to 208 from the light sources 201 to 204, and a light-emitting end 210b (or proximal end) that emits cones of light 212 to 215 based on the received light 205 to 209. In this embodiment, that only requires the use of a single optical fiber or light guide, the four or more light sources are intended to be in a known rigid spatial arrangement with respect to one another, thus forming a coordinate system. The arrangement of light sources may also be attached rigidly to a secondary structure, such as a machine, a vehicle, or a person, for localizing and tracking said secondary structure. The cones of light 212 to 215 are projected onto a light-detection component 211. In embodiments of the invention, the direction, position, and orientation of the light sources 201 to 205 are determined based on the characteristics of the cones of light 212 to 215. In particular, light is emitted from the optical fiber 210 at an angle that corresponds to the angle at which light enters the optical fiber 210, but while the light enters the optical fiber 210 as a beam, the light leaving the optical fiber 210 leaves the optical fiber 210 in the shape of a cone. Accordingly, the direction from which the light enters the optical fiber 210 may be determined by analyzing the characteristics of the shapes of the projected cones of light 212 to 215 that are projected onto light detection component 211. In this embodiment, where the user has full knowledge and control over the intrinsic characteristics of the light sources 205 to 208, unique spectral characteristics, intensity variations, and temporal modulations of each light source may be used to improve the measurements of the geometric properties of the light cones 212 to 215 that are projected onto light detection component 211.

While four sources of light 201 to 204 are illustrated in FIG. 2, embodiments of the invention encompass any number of sources of light. In an embodiment in which only three cones of light emitted from the same optical fiber 210 are analyzed, and in which the three cones of light correspond to only three directional light sources, a direction of the sources of light may be determined. In another embodiment in which at least four cones of light emitted from the same optical fiber 210 are analyzed and the four cones of light correspond to four light sources, the direction, orientation, and the location of the sources of light may be determined.

While cones of light 212 to 215 are represented in FIG. 2 for purposes of illustration, the depictions of FIG. 2 should not be considered accurate depictions of the actual shapes of the cones of light that would be generated by light sources 201 to 204 relative to the optical fiber 210.

Unless otherwise indicated, light sources according to embodiments of the invention may include any type of light sources, including natural light sources and fabricated light sources. Examples of light sources include stars or the moon, light bulbs, light-emitting diodes, lasers, or any other light source. Directional light sources are lasers or focused beams of light. Non-directional light sources project light over a large angular spatial extent that is not focused into a narrow beam, like a point source or an LED.

In embodiments of the invention, one or both of the light sources and optical fiber sensors may be mobile. For example, in one embodiment, the light sources are mounted on a vehicle, such as an automobile or aircraft, and the optical fiber sensors assemblies are stationary to determine the distance of the vehicle from the sensor assembly based on the light from the light sources. In another embodiment, the sensor assemblies are mounted to the vehicle and the light sources are stationary. In yet another embodiment, both the sources and sensor assemblies are in relative motion with respect to each other.

Figure 3:
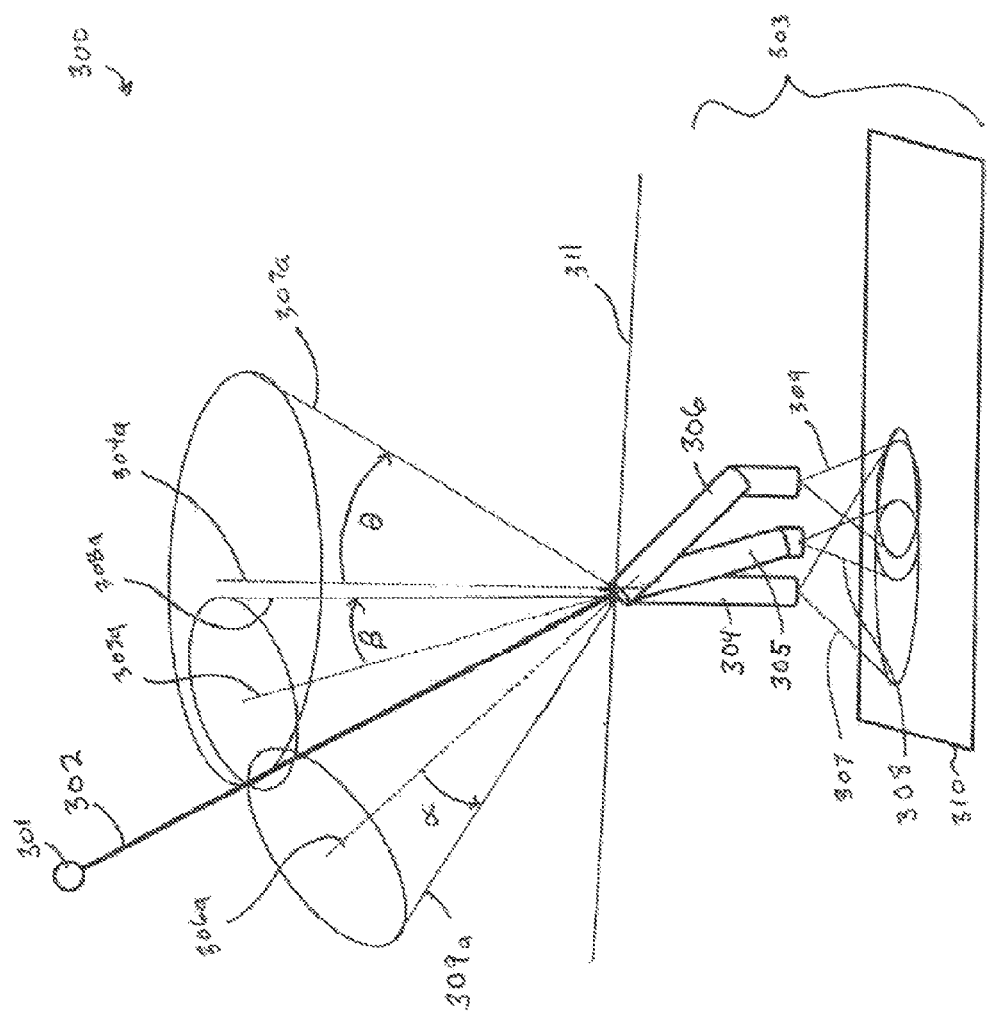
FIG. 3 illustrates a system for localizing and tracking the direction of a directional light source according to another embodiment of the invention.

FIG. 3 illustrates a system 300 for detecting spatial characteristics of a light source according to another embodiment of the invention. The system includes a light source 301 which emits light 302 to the light-receiving ends of optical fibers 304, 305, and 306. In one embodiment, the light source 301 is a laser, and the light 302 is a laser beam. The optical fibers 304 to 306 are part of an optical fiber sensor assembly 303 which includes the optical fibers 304 to 306 and a light-detection component 310 for detecting characteristics of the projected cones of light 307, 308 and 309 corresponding to light from the light source 301 output from the optical fibers 304 to 306. In an embodiment in which the light source 301 is a laser, the light-receiving ends of the optical fibers 304 to 306 may all be located adjacent to each other within a circumference of the laser beam 302.

In FIG. 3, the lines 304a, 305a, and 306a represent axes corresponding to the distal light-receiving ends of the optical fibers 304, 305, and 306, respectively. The cones 307a, 308a, and 309a correspond to the cones 307, 308, and 309 of light emitted from the optical fibers 304, 305, and 306. The cones 307a, 308a, and 309a are defined by the axes 304a, 305a, and 306a passing through the apex of the cones 307a, 308a, and 309a, and having the sides of the cones arranged at angles θ, β, and α. The angle θ is defined by the angle of the light 302 relative to the axis 304a. The angle β is defined by the angle of the light 302 relative to the axis 305a. The angle α is defined by the angle of the light 302 relative to the axis 306a. The sides of the cones 307a, 308a, and 309a are formed by rotating a line corresponding to the angles θ, β, and α around their respective axes 304a, 305a, and 306a.

As mentioned above, the cones 307a, 308a, and 309a correspond to the cones 307, 308, and 309, such that the angle of the beam of light 302 relative to the axes 304a, 305a, and 306a determine the shapes of the cones of light 307, 308, and 309.

In one embodiment, the angular relationship between the three fiber axes corresponds to the intersecting edges at the vertex of a tetrahedron.

In operation, the characteristics of the cones 307 to 309 are detected by the light-detection component 310 to determine the direction of the source of light 301. In particular, the intersection of two cones having a common vertex (i.e. the light-receiving end of the optical fibers) yields two possible directions of the laser. The intersection of the third cone then resolves the correct direction among the two possible directions.

In operation, two or more measurements may be combined over time to yield additional information. For example, if two or more non-concurrent direction measurements are made from a moving platform that is being lased, the two direction measurements may be triangulated to determine the source location of the laser beam.

While only one light source 301 is illustrated in FIG. 3 for purposes of description, embodiments are not limited to determining the position of only one light source. For example, in one embodiment, multiple different light sources exist and the light cones of the different light sources are analyzed to determine the directions of each light source. In one embodiment, the multiple different light sources are of different colors or different intensities or have different temporal modulations. In addition, while the light-emitting ends of the optical fibers 304 to 306 are illustrated as being separated from each other for purposes of illustration, embodiments include light-emitting ends that are adjacent to each other.

While three optical fibers 304 to 306 are illustrated in FIG. 3, embodiments of the invention encompass any number of optical fibers. In one embodiment, only two optical fibers are used to determine the direction of a light source. In such an embodiment, the light source and the two optical fibers are all located on the same plane. More particularly, the distal axes corresponding to the light-receiving ends of the optical fibers are located along the same plane as the light source.

Figure 4:
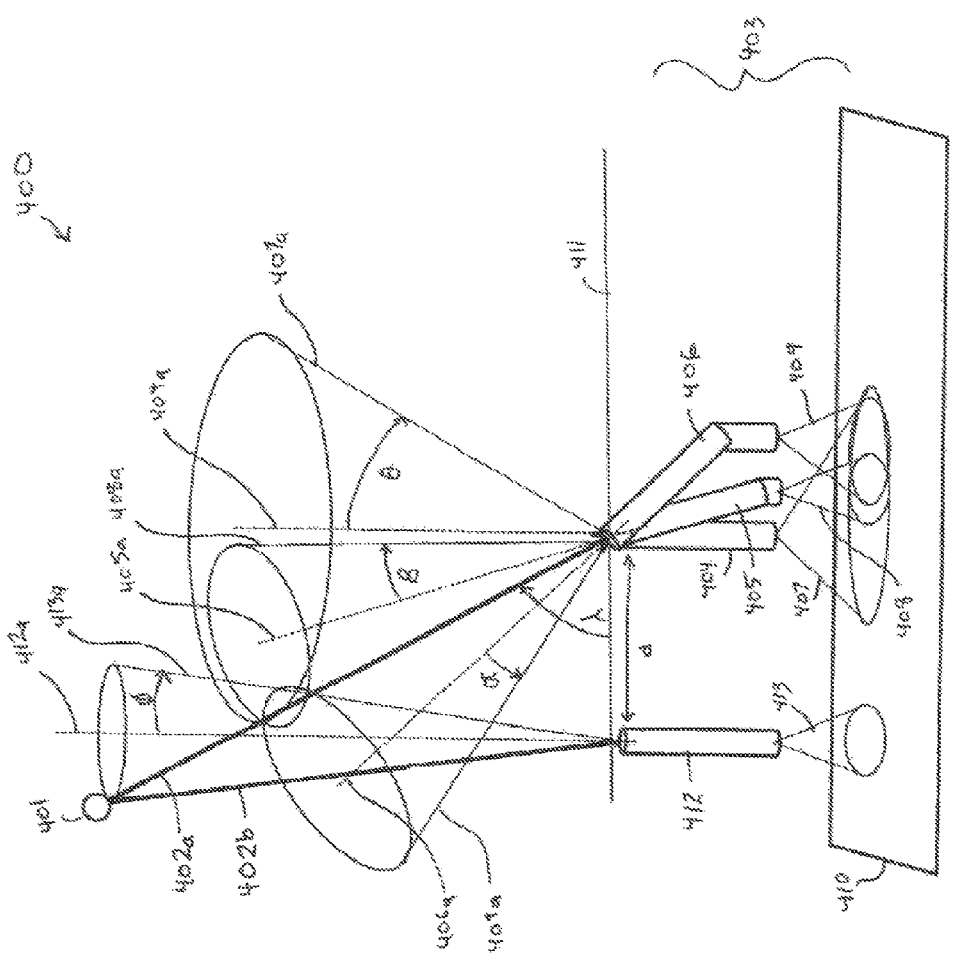
FIG. 4 illustrates a system for localizing and tracking a non-directional light source according to another embodiment of the invention.

FIG. 4 illustrates a system 400 locating or tracking a light source according to another embodiment of the invention. The system includes a light source 401, which may be a multi-directional light source, such as a light bulb, which emits light 402a to the distal light-receiving ends of optical fibers 404, 405, and 406 and light 402b to the distal light-receiving end of the optical fiber 412. The optical fibers 404 to 406 are part of an optical fiber sensor assembly 403 which includes the optical fibers 404 to 406 and a light-detection component 410 for detecting characteristics of the shapes of the projected cones of light 407, 408 and 409 corresponding to light from the light source 401 output from the optical fibers 404 to 406.

In FIG. 4, the lines 404a, 405a, and 406a represent axes corresponding to the distal light-receiving ends of the optical fibers 404, 405, and 406, respectively. The cones 407a, 408a, and 409a correspond to the cones 407, 408 and 409 of light emitted from the optical fibers 404, 405, and 406.

The cones 407a, 408a, and 409a are defined by the axes 404a, 405a, and 406a passing through the apex of the cones 407a, 408a, and 409a, and having the sides of the cones arranged at angles θ, β, and α. The angle θ is defined by the angle of the light 402a relative to the axis 404a. The angle β is defined by the angle of the light 402a relative to the axis 405a. The angle α is defined by the angle of the light 402a relative to the axis 406a. The sides of the cones 407a, 408a, and 409a are formed by rotating a line corresponding to the angles θ, β, and α around their respective axes 404a, 405a, and 406a. In one embodiment, the direction of the light source 401 is represented by an angle λ relative to a horizontal axis 411 passing through the distal light-receiving ends of the optical fibers 404 to 406.

The optical fiber sensor assembly 403 further includes a fourth optical fiber 412 having a distal light-receiving end separated from the distal light-receiving ends of the optical fibers 404 to 406 by a distance d. The line 412a represents an axis corresponding to the distal light-receiving end of the optical fiber 412. The cone 413a corresponds to the cone 413 of light emitted from the optical fiber 412. The cone 413a is defined by the axis 412a passing through the center of the light-receiving end of the optical fiber 412 and having sides arranged at an angle φ. The sides of the cone 413a are formed by rotating a line corresponding to the angle φ around its axis 412a. Light from optical source 401 propagates to optical fiber 412 via light beam 402b.

In operation, the characteristics of the cones 407 to 409 are detected by the light-detection component 410 to determine a direction of the light source 401, and the characteristics of the cone 413 caused by the incident light beam 402b, are added to those of the cones 407 to 409 to determine the location of the light source 401. In the embodiment illustrated in FIG. 4, the optical fiber 412 and the axis 412a are arranged vertically, or perpendicular to the horizontal plane 411. However, embodiments of the invention are not limited to the illustrated angle, and the optical fiber 412 and corresponding axis 412a may be arranged at any angle.

Figure 5:
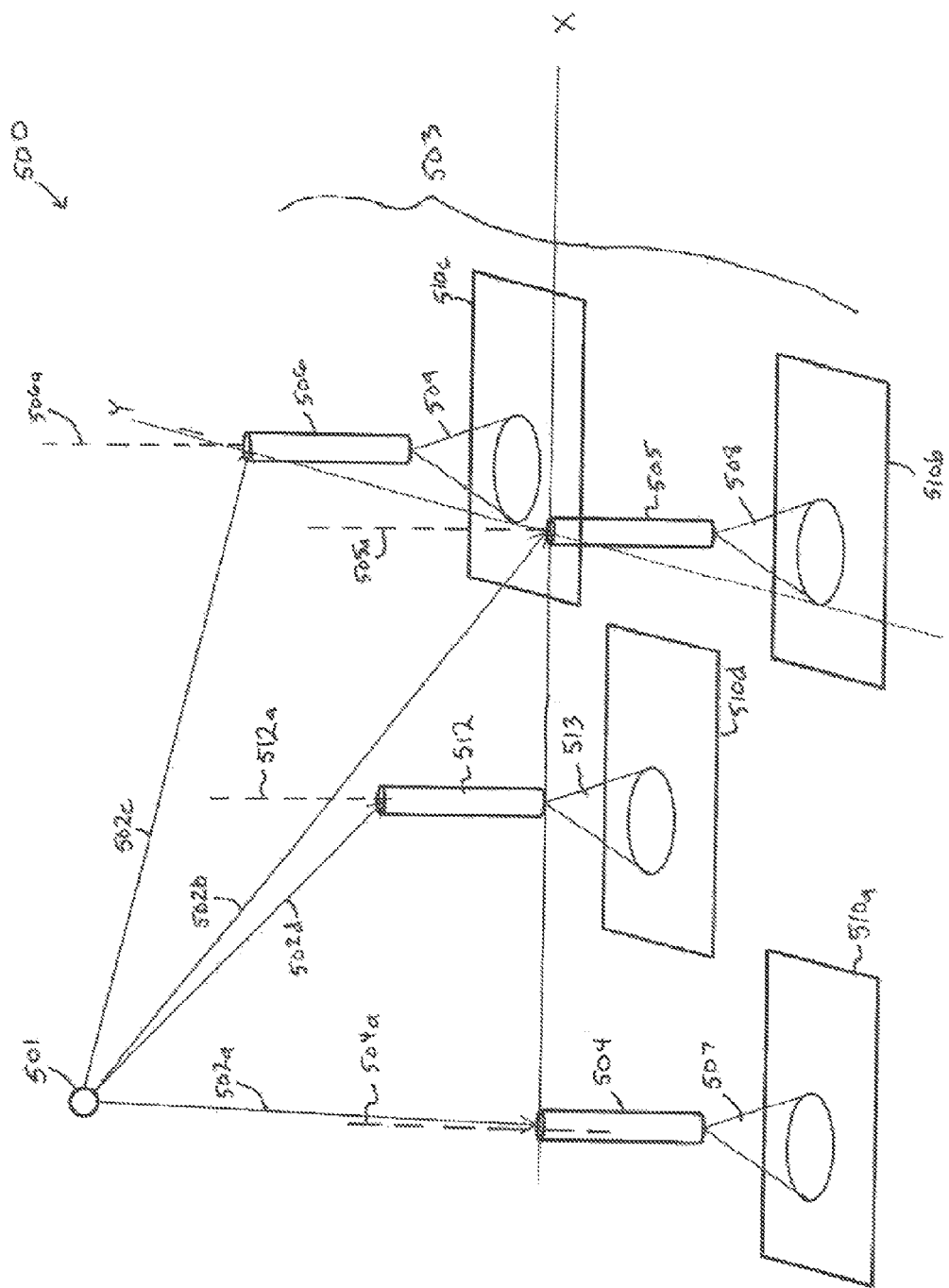
FIG. 5 illustrates an alternative system for localizing and tracking a non-directional light source according to another embodiment of the invention.

FIG. 5 illustrates a system 500 for detecting spatial characteristics of a light source according to another embodiment of the invention. The system includes a light source 501 which emits light 502a, 502b, and 502c to the light-receiving ends (or distal ends) of optical fibers 504, 505, and 506. The optical fibers 504 to 506 are part of an optical fiber sensor assembly 503 which includes the optical fibers 504 to 506 and one or more light-detection components 510a, 510b, and 510c for detecting characteristics of the projected cones of light 507, 508 and 509 corresponding to light from the light source 501 output from the optical fibers 504 to 506. While the light-detection components 510a to 510c are illustrated separately, embodiments of the invention encompass a single light-detection component having a size sufficient to encompass the cones 507, 508, and 509 emitted by each of the optical fibers 504 to 506.

The optical fiber assembly 503 also includes a fourth optical fiber 512 which emits a cone of light 513 based on the light 502d received from the light source 501. In the embodiment of FIG. 5, the optical fibers 504 to 506 are spaced apart from each other and the light-receiving ends, or the axes 504a to 506a representing the distal light-receiving ends, are displaced from each other and at a fixed angle with respect to each other. The fixed angle is zero in the case where optical fibers are parallel to each other. Likewise the distal axis of the optical fiber 512 is displaced from but not necessarily parallel to the optical fibers axes corresponding to fibers 504 to 506. The light source 501 must be within the field-of-view of all the optical fibers 504 to 506 and 512.

In one embodiment, the optical fibers 504 to 506 are arranged such that at least two of the optical fibers are displaced along a first axis and at least two of the optical fibers are displaced along a second axis perpendicular to the first axis. In FIG. 5, the optical fiber 504 is displaced from the optical fiber 505 along the X axis, and the optical fiber 505 is displaced from the optical fiber 506 along the Y axis. Although FIG. 5 illustrates an embodiment in which the optical fibers 504 and 505 are aligned or co-linear along the X axis, embodiments encompass the optical fibers 504 and 505 being displaced in the direction of the Y axis as well as the X axis. Likewise, although FIG. 5 illustrates an embodiment in which the optical fibers 505 and 506 are aligned or co-linear along the Y axis, embodiments encompass the optical fibers 505 and 506 being displaced in the direction of the X axis as well as the Y axis.

In operation, the characteristics of the cones 507 to 509 are detected by the light-detection components 510a, 510b, and 510c to determine two possible positions of the light source 501, and the characteristics of the cone 513 are analyzed along with those of the cones 507 to 509 to resolve the actual position of the light source 501.

Figure 6:
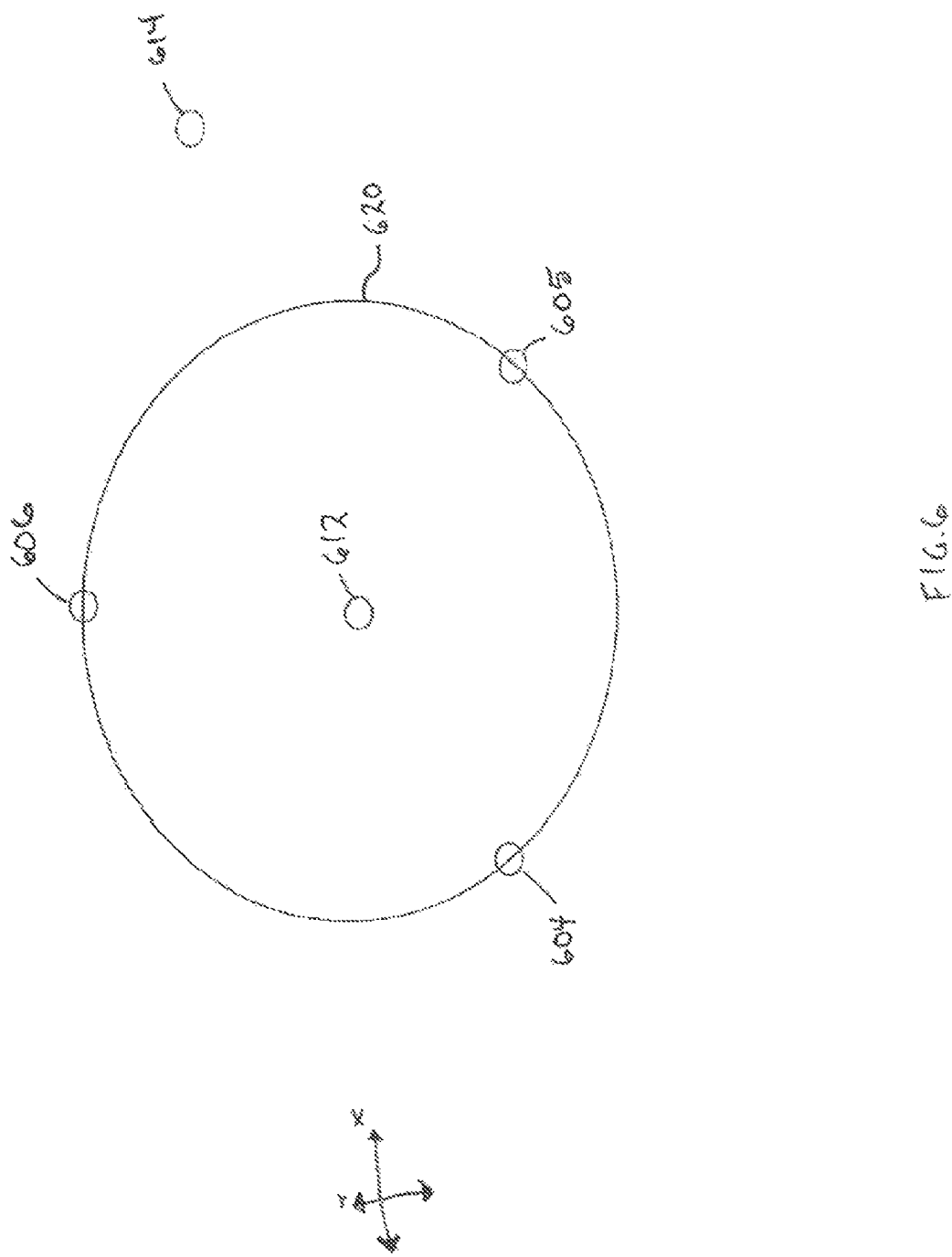
FIG. 6 illustrates optimal arrangements of sensors that are used in a system for localizing and tracking a light source according to yet another embodiment of the invention.

FIG. 6 illustrates an arrangement of either multiple light sources or multiple fiber optic sensors according to an embodiment of the invention.

In one embodiment, elements 604, 605, 606, and 612 represent different light sources. In such an embodiment, the light from the light sources may be detected by a single optical fiber to determine a direction, orientation, and position of the single optical fiber relative to the light sources. In another embodiment, the elements 604, 605, 606, and 612 represent different optical fibers that receive light from one or more light sources to generate cones of light, which are then used to determine one or both of the direction and location of the one or more sources of light. For purposes of simplicity in description, the elements 604 to 606 and 612 are referred to below as optical fibers.

In one embodiment, the optical fibers 604 to 606 are arranged relative to the X axis and Y axis such that the optical fibers 604 to 606 define a circumference 620 of a circle, or are all arranged on the circumference 620 of the circle. In one embodiment the optical fibers 604 to 606 are equidistant from each other around the circumference 620 of the circle, but embodiments of the invention are not limited to such an arrangement. Instead, the optical fibers 604 to 606 may be located any distance from each other.

In an embodiment in which it is desired to maintain the optical fiber sensor assembly as compact as possible while obtaining the most accurate measurements of the cones of light possible, a fourth optical fiber 612 is located at the center of the circle 620. In such an embodiment, the greatest geometric diversity of angle measurements is obtained while minimizing the optical fiber sensor assembly footprint. However, in another embodiment, an optical fiber 614 may be located outside the circumference 620 of the circle. In such an embodiment, the long-range accuracy of the fiber optical sensor assembly increases while also increasing the footprint of the fiber optic sensor assembly. In some embodiments, the optical fibers 612 or 614 are not located along the circumference 620 of the circle.

While embodiments have been described in which the location of one or more light sources is determined based on analyzing cones of light, in another embodiment in which an intensity of the one or more light sources is known, the distance from the one or more optical fibers to the one or more light sources may be calculated based on the known light intensity instead of based on shape characteristics of a cone of light output by the one or more optical fibers based on the light from the one or more light sources.

Figure 7:
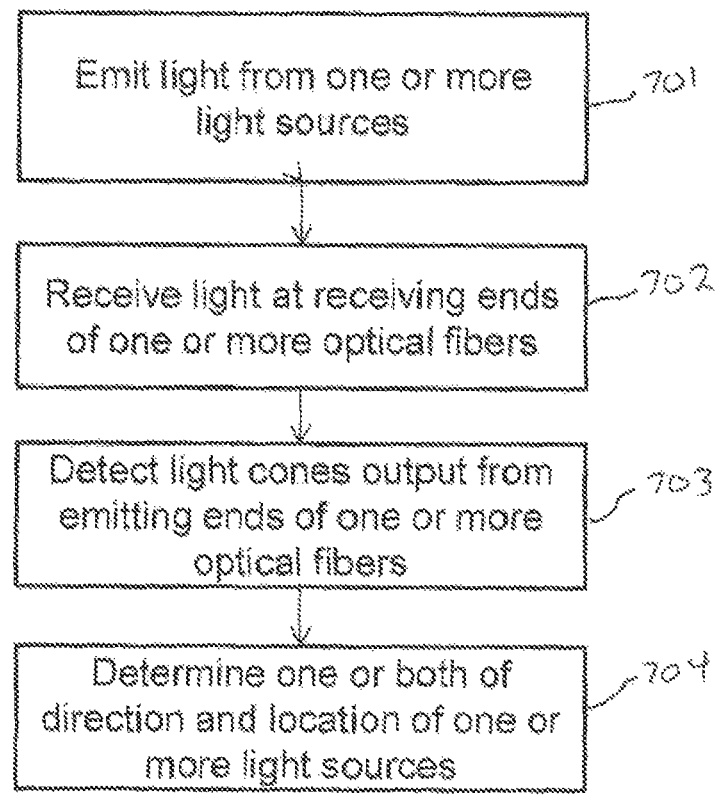
FIG. 7 is a flow diagram of a method according to an embodiment of the invention.

FIG. 7 is a flow diagram of a method according to an embodiment of the invention. In block 701, light is emitted from one or more light sources. The light may be generated by one or more devices, such as bulbs, LEDs, lasers, or any other light-generating devices, or the light may be generated by a natural source, such as the sun, stars, or light reflected off of the moon.

In block 702, light is received at the light-receiving ends, or distal ends, of one or more optical fibers, possibly through distal optics to focus the optical signals. In block 703, light cones are output from light-emitting ends, or proximal ends, of the one or more optical fibers, and the light cones are detected by a light-detection component. In block 704, the characteristics of the light cones are analyzed to determine spatial characteristics of the one or more light sources. In particular, one or more of the direction, orientation and position of the one or more light sources, or the structure and coordinate system with which they are associated, may be determined relative to the one or more optical fibers.

As discussed in the present embodiments, the one or more light sources may include only one light source, and the one or more optical fibers may include two, three, four, or more optical fibers. Alternatively, the one or more light sources may include three, four, or more light sources, and the one or more optical fibers may include only one optical fiber. According to yet another alternative embodiment, the one or more light sources may include multiple light sources and the one or more optical fibers may include multiple optical fibers.

Embodiments of the invention may be implemented in any field, structure, device, vehicle, or in any situation in which one or more of a direction, orientation, and a location of one object is determined relative to another object, and in particular one object including a light source and the other including a fiber optic sensor. Examples of some implementations of embodiments include optical free space optical communication (FSOC) acquisition, FSOC between moving platforms, the identification of the direction or source position of a laser beam impinging on an aircraft or other platform, laser targeting detection and tracing, surveillance cueing, robotics, medical equipment positioning, camera movement and compensation, detecting shifting loads, detecting the position of a vehicle, such as a smart car, aircraft or other vehicle, tracking heavenly objects, such as the sun, moon, or stars, navigation, tracking the position of a human, such as athlete position tracking, etc. It is understood that embodiments of the invention are not limited to the above examples.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments have been chosen and described in order to best explain the principles of the invention and the practical application, and to enable others of ordinary skill in the art to understand the invention for various embodiments with various modifications as are suited to the particular use contemplated.

While various non-limiting, example embodiments have been herein described, it will be understood that those skilled in the art, both now and in the future, may make various improvements and enhancements which fall within the scope of the claims which follow.

What is claimed is:

1. A system for localizing one or more light sources, comprising:
one or more optical fiber sensors configured to receive light from the one or more light sources and to emit, from proximal ends of the one or more optical fiber sensors, a plurality of cones of light according to relative positions of the one or more optical fiber sensors relative to the one or more light sources; and
light data processing circuitry configured to detect the plurality of cones of light and to determine spatial characteristics of the one or more light sources relative to the positions of one or more optical fibers,
wherein the plurality of cones of light include at least three cones of light,
wherein determining the spatial characteristics of the one or more light sources includes detecting a concurrent angle of incidence measurements, non-concurrent direction measurements, and non-concurrent position measurements of at least three cones of the light corresponding to the one or more light sources to determine a direction of the one or more light sources relative to the one or more optical fibers.

2. The system of claim 1, wherein the one or more light sources include at least three light sources, and the light data processing circuitry is configured to detect the at least three cones of light corresponding to the at least three light sources to determine a direction, as the spatial characteristics, of the at least three light sources relative to the one or more optical fiber sensors.

3. The system of claim 2, wherein the one or more optical fiber sensors include only one optical fiber sensor having only one optical fiber, and the plurality of cones of light are all emitted from the distal end of the only one optical fiber.

4. The system of claim 2, wherein
the at least three light sources include at least four light sources, and
the light data processing circuitry is configured to detect the at least four cones of light corresponding to the at least four light sources to determine a direction and a location, as the spatial characteristics, of the at least four light sources relative to the one or more optical fiber sensors.

5. The system of claim 4, wherein the at least four light sources include three light sources defining a circumference of a circle and a fourth light source at a center of the circle.

6. The system of claim 4, wherein the at least four light sources include three light sources defining a circumference of a circle and a fourth light source located outside the circumference of the circle.

7. The system of claim 1, wherein
the one or more optical fiber sensors include at least two optical fibers having light-receiving ends adjacent to each other and arranged at an angle relative to each other, and
the light data processing circuitry is configured to detect at least two cones of light corresponding to a same first light source among the one or more light sources and to determine a direction, as the spatial characteristics, of the first light source relative to the one or more optical fiber sensors.

8. The system of claim 1, wherein
the one or more optical fiber sensors include at least three optical fibers having distal light-receiving ends adjacent to each other and arranged at angles relative to each other, and
the light data processing circuitry is configured to detect of the at least three cones of light corresponding to a same first light source among the one or more light sources and to determine a direction, as the spatial characteristics, of the first light source relative to the one or more optical fiber sensors.

9. The system of claim 8, wherein the one or more light sources are lasers, and distal light-receiving ends of the at least three optical fibers are within a diameter of the laser beams of the one or more light sources.

10. The system of claim 8, wherein
the one or more fiber optic sensors include at least one optical fiber having a distal light-receiving end spaced apart from the at least three optical fibers having distal light-receiving ends adjacent to each other, and
the light data processing circuitry is configured to detect a direction and a location, as the spatial characteristics, of the one or more light sources based on the plurality of cones of light emitted from the at least three optical fibers and the at least one optical fiber.

11. The system of claim 1, wherein the one or more fiber optic sensors include at least three optical fibers spaced apart from each other and having distal light-receiving ends aligned parallel or at a fixed angle with respect to each other.

12. The system of claim 1, wherein the one or more optical fiber sensors include a light-detection component onto which the plurality of cones of light are projected to detect the plurality of cones of light.

13. The system of claim 12, wherein the light data processing circuitry determines the spatial characteristics of the one or more sources of light based on a location of a distal light-receiving end of an optical fiber of the one or more optical fiber sensors, a location of a proximal light-emitting end of the optical fiber, a location of the light-detection component relative to the proximal light-emitting end of the optical fiber, and the plurality of cones of light on the light-detection component.

14. A method of performing one or both of locating and tracking one or more light sources comprising, said method comprising:
receiving, by a distal light-receiving end of one or more optical fibers, light from the one or more light sources and emitting, by a proximal light-emitting end of the one or more optical fibers, a plurality of cones of light according to relative positions of the one or more optical fibers relative to the one or more light sources;
detecting, by light data processing circuitry, positions of the plurality of cones of light; and
determining, by the light data processing circuitry, spatial characteristics of the one or more light sources relative to the one or more optical fibers based on the positions of the plurality of cones of light,
wherein the plurality of cones of light include at least three cones of light,
wherein determining a direction, as the spatial characteristics, of the one or more light sources includes detecting a concurrent angle of incidence measurements, non-concurrent direction measurements, and non-concurrent position measurements of at least three cones of the light corresponding to the one or more light sources to determine a direction of the one or more light sources relative to the one or more optical fibers.

15. The method of claim 14, wherein
the one or more light sources include at least three light sources, and
determining the direction of the one or more light sources includes detecting the at least three cones of light corresponding to the at least three light sources to determine the direction of the at least three light sources relative to the one or more optical fibers.

16. The method of claim 15, wherein the at least three light sources include at least four light sources, and the method further comprises:
detecting a location of the at least four light sources relative to the one or more optical fibers based on at least four cones of light corresponding to the at least four light sources.

17. The method of claim 14, wherein
the one or more optical fibers include at least three optical fibers having distal light-receiving ends adjacent to each other and arranged at angles relative to each other, and
determining the direction of the one or more light sources includes analyzing characteristics of the at least three cones of light emitted from different optical fibers, the at least three cones of light corresponding to a same first light source among the one or more light sources, to determine the direction of the first light source relative to the at least three optical fibers.

18. The method of 17, wherein the one or more optical fibers include a fourth optical fiber having a distal light-receiving end spaced apart from the at least three optical fibers, the method further comprising:
determining a location, as the spatial characteristics, of the one or more light sources based on the at least three cones of light and a fourth cone of light output form the fourth optical fiber.

19. The method of claim 14, wherein the one or more optical fibers include the at least three optical fibers having distal light-receiving ends displaced from and parallel or at a fixed angle with respect to each other.

20. The method of claim 19, wherein
the distal light-receiving ends of the at least three of the optical fibers define three points of a circumference of a circle,
the distal light-receiving end of a fourth optical fiber is located at a center of the circle, and
the method further comprises determining a location, as the spatial characteristics, of the one or more light sources based on the at least three cones of light emitted from proximal light-emitting ends of the at least three optical fibers and the fourth optical fiber.

* * * * *